United States Patent Office 3,344,219
Patented Sept. 26, 1967

3,344,219
PROCESS FOR MANUFACTURING SHAPED ARTICLES OF OPTICALLY ACTIVE POLY-γ-METHYL GLUTAMATE
Ryoichi Wakasa, Hidehiko Kobayashi, Koretaka Yamaguchi, Hakaru Uchio, Masaki Ishigami, and Hiroaki Hachino, Tokyo, Japan, assignors to Asahi Kasei Kogyo Kabushiki Kaisha, Osaka, Japan, a corporation of Japan
Filed July 14, 1964, Ser. No. 382,579
Claims priority, application Japan, July 18, 1963, 38/36,752; June 3, 1964, 39/31,157; June 13, 1964, 39/33,217, 39/33,218; June 24, 1964, 39/35,577, 39/35,578; June 29, 1964, 39/36,368
13 Claims. (Cl. 264—183)

ABSTRACT OF THE DISCLOSURE

A process for the production of shaped articles, such as films and fibers, by polymerizing an optically active γ-methyl glutamate N-carboxy anhydride in the form of a solution in a mixture of up to 70% by volume of acetonitrile and at least one halogenated hydrocarbon, and subjecting the resulting transparent, uniform, high concentration solution of an optically active poly-γ-methyl glutamate having a high molecular weight to either dry shaping or wet shaping. The optically active poly-γ-methyl glutamate consists of at least 90% by weight of optically active γ-methyl glutamate units. If necessary, the shaped article may be stretched after coagulation to be oriented in order to enhance the strength of the article.

---

The present invention relates to a process for manufacturing shaped articles of optically active poly-γ-methyl glutamate, which contain more than 90 weight percent of optically active γ-methyl glutamate, that is, γ-methyl L-glutamate or γ-methyl D-glutamate. It is well known that optically active γ-methyl glutamate can easily be obtained by esterifying the carboxyl group at the γ position of optically active glutamic acid with methanol and reacting the product with phosgene to form optically active γ-methyl glutamate N-carboxy anhydride (abbreviated to γ-Me-Glu NCA, below). It is also well known according to British Patent 864,692 (1961) that the said γ-Me-Glu NCA is polymerized to form a solution of optically active poly-γ-methyl glutamate (abbreviated to poly-γ-Me-Glu NCA, below), which can be wet- or dry-spun to obtain the poly-γ-Me-Glu fibers.

In the process wherein γ-Me-Glu NCA is dissolved in a solvent to which is added an initiator, the γ-Me-Glu NCA is polymerized to form a solution of high molecular weight optically active poly-γ-Me-Glu which has a capacity of forming fibers or films. The present invention relates to a process for preparing mouldings consisting of poly-γ-Me-Glu which comprises using as a polymerization solvent a mixture of acetonitrile and halogenated aliphatic hydrocarbons to thereby obtain a transparent, uniform and highly concentrated solution of poly-γ-Me Glu, coagulating the said solution by extruding it into a coagulating bath which consists of a suitable nonsolvent for poly-γ-Me-Glu, or by removing the solvent with hot air and, if necessary, stretching the coagulated poly-γ-Me-Glu appropriately.

As compared with known processes, the present invention permits one to obtain a transparent, uniform and highly concentrated solution of poly-γ-Me-Glu by using the polymerization solvent according to the present invention; to easily and economically prepare shaped articles of poly-γ-Me-Glu by wet shaping the said solution by extrusion into a coagulating bath or by dry shaping through extrusion of same into hot air, and especially to provide a suitable process for preparing fibers or films of poly-γ-Me-Glu. Conventionally, a polymerization solvent for N-carboxy acid anhydrides (abbreviated to NCA, below) of α-amino acid has been a hydrocarbon such as benzene, toluene, xylene, cyclic ethers, such as 1,4-dioxane, esters such as methyl acetate and ethyl acetate, halogenated hydrocarbons such as chloroform, methylene chloride, 1,2-dichloroethane and chlorobenzene, nitro compounds such as nitrobenzene or ketones such as acetone alone or as a combination of two or more of said solvents.

In the polymerization of NCA by using the above compounds as polymerization solvent, the states of polymerization can be divided into a first state wherein the formed poly amino acid is not dissolved in the polymerization solvent and is obtained as precipitate, a second state wherein the formed poly amino acid is dissolved in the polymerization solvent to be obtained as a solution of poly amino acid, and a third state wherein the formed poly amino acid is neither completely precipitated nor completely dissolved and is obtained in a gel state. For example, the first state appears in the polymerization of L-alanine NCA in the presence of benzene or 1,4-dioxane as polymerization solvent, the second state appears in the polymerization of γ-Me-Glu NCA in the presence of methylene chloride or 1,2-dichloroethane as polymerization solvent, and the third state appears in the polymerization of γ-Me-Glu NCA in the presence of 1,4-dioxane or nitrobenzene as the polymerization solvent.

Since melting is not observed in poly-γ-Me-Glu while it does appear in common polyamides, polyolefines, polyesters and the like, it is necessary when shaping poly-γ-Me-Glu that the solution of poly-γ-Me-Glu be manufactured and coagulated by the wet spinning or wet film forming process for ejecting the said solution into the coagulating solvent or by the dry spinning or dry film forming process for removing the solvent for the shaping. Therefore, if the solution obtained in the said second state is a transparent, uniform and properly concentrated solution of poly-amino acid and is used for preparing the shaped articles of poly-γ-Me-Glu, it is readily available as a solution for the manufacture of fibers or films or other shaped articles and makes possible a continuous process from the polymerization to the manufacture of fibers or films or other shaped articles, which is very advantageous from the industrial point of view.

As described above, British Patent No. 864,692 discloses a process which comprises using as a polymerization solvent a mixture consisting of halogenated aliphatic hydrocarbons having 4 or less carbon atoms and 2 or more chlorine atoms in the major part and 1,4-dioxane or ethyl acetate in the minor part and carrying out the polymerization at an initial concentration of γ-Me-Glu NCA of 5 to 20%, to obtain a transparent solution of poly-γ-Me-Glu, and preparing fibers by spinning the solution directly.

In that process, however, the solubility of γ-Me-Glu NCA is very low in halogenated aliphatic hydrocarbons such as chloroform, methylene chloride, 1,2-dichloroethane and the like which comprises the major part of the polymerization solvent. The solubilities of γ-Me-Glu NCA crystals for those solutions at 20° C. according to the measurement of the present inventors are 0.9 g./100 cc. chloroform, 0.8 g./100 cc. methylene chloride and 2.1 g./100 cc. 1,2-dichloroethane. On the other hand, 1,4-dioxane or ethyl acetate which comprises the minor part of the solvent is a relatively good solvent for γ-Me-Glu NCA. According to the measurement of the present inventors, the solubility of γ-Me-Glu NCA at 20° C. is 24 g./100 cc. 1,4-dioxane and 9.3 g./100 cc. ethyl acetate. Therefore, the mixed solvent consisting of halogenated aliphatic hydrocarbons and dioxane or ethyl acetate is superior to halogenated aliphatic hydrocarbons used individually, with respect to the solubility of γ-Me-Glu NCA.

The drawings annexed to the present specification are illustrative diagrams for the solubilities of the optically active L-form γ-Me-Glu NCA in various solvents at 20° C.

Figure 1:
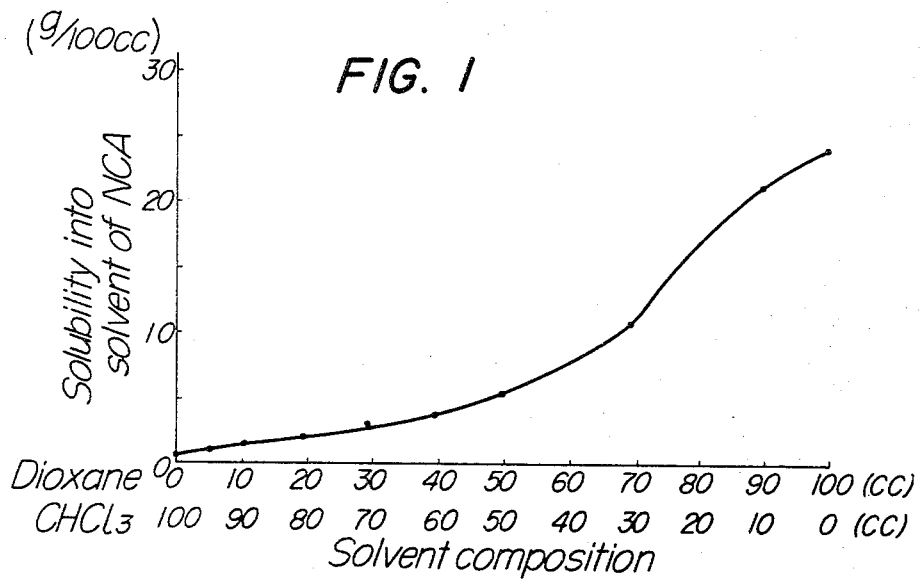
FIGURE 1 illustrates the solubility of γ-Me-Glu NCA in a mixed solvent of dioxane and chloroform.
Figure 2:
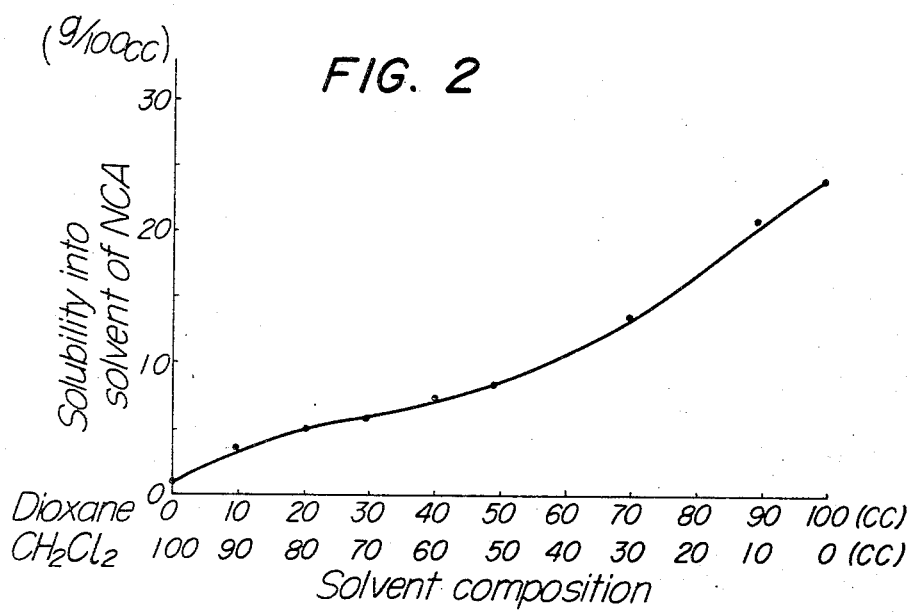
FIGURE 2 illustrates the solubility of γ-Me-Glu NCA in a mixed solvent of dioxane and methylene chloride.
Figure 3:
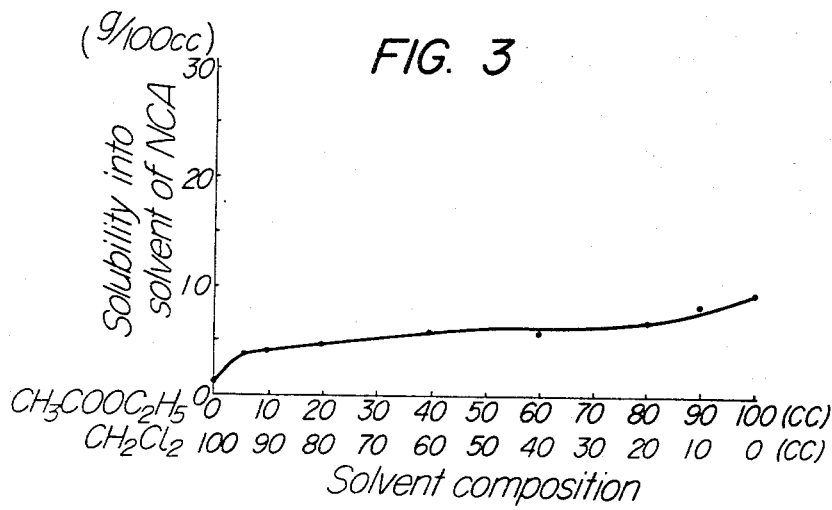
FIGURE 3 illustrates the solubility of γ-Me-Glu NCA in a mixed solvent of ethyl acetate and methylene chloride.
Figure 9:
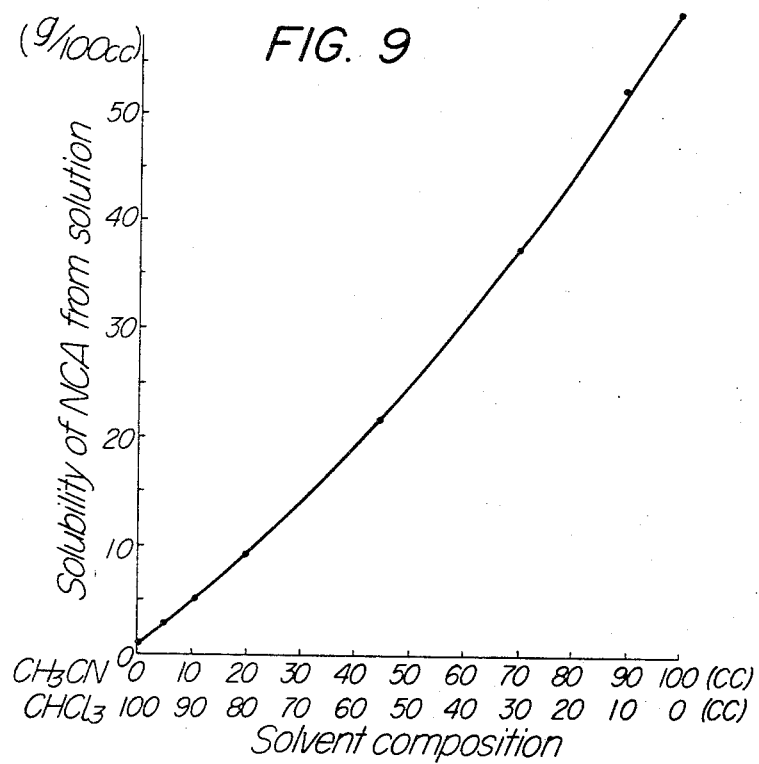
FIGURE 9 illustrates the solubility of γ-Me-Glu NCA from a solution mixture of acetonitrile and chloroform.
Figure 4:
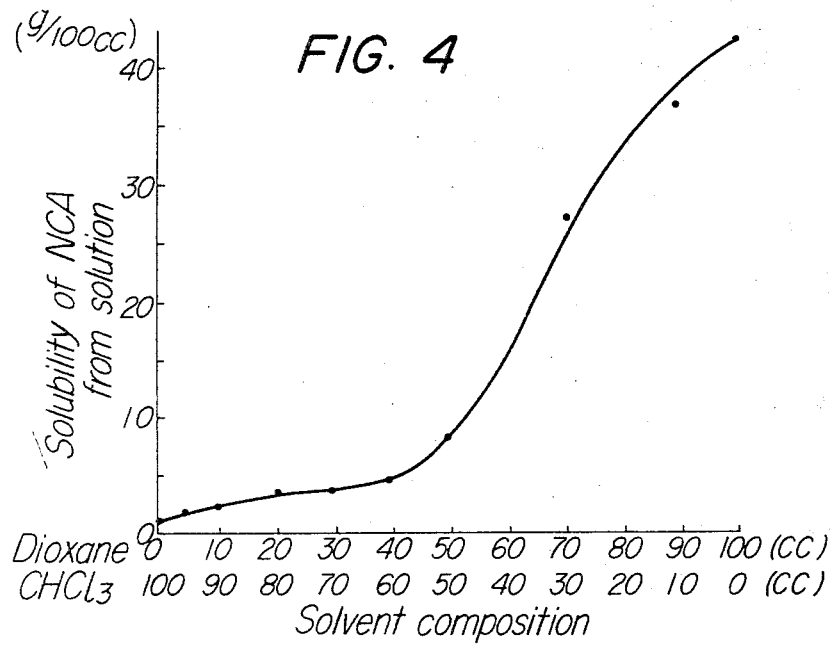
FIGURE 4 illustrates the solubility of γ-Me-Glu NCA from a solution mixture of dioxane and chloroform.
Figure 5:
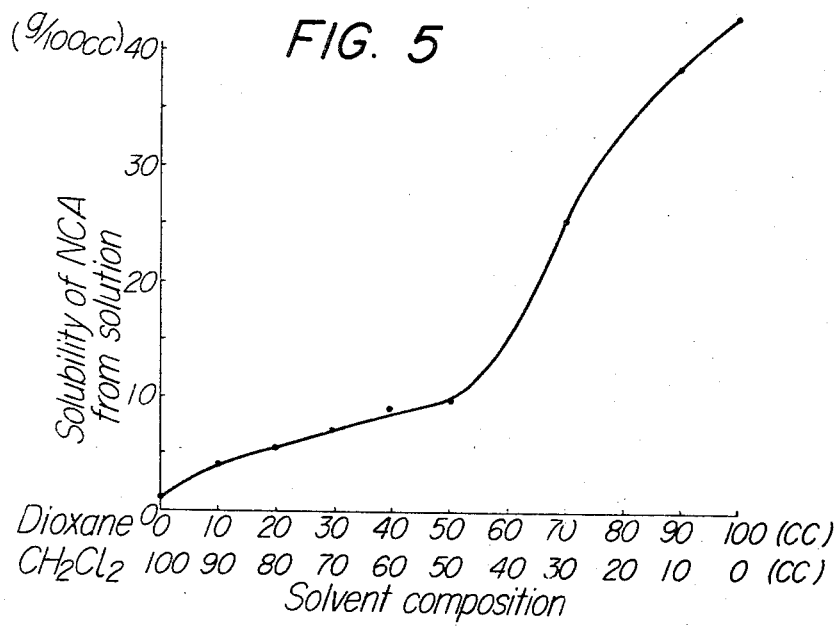
FIGURE 5 illustrates the solubility of γ-Me-Glu NCA from a solution mixture of dioxane and methylene chloride.
Figure 6:
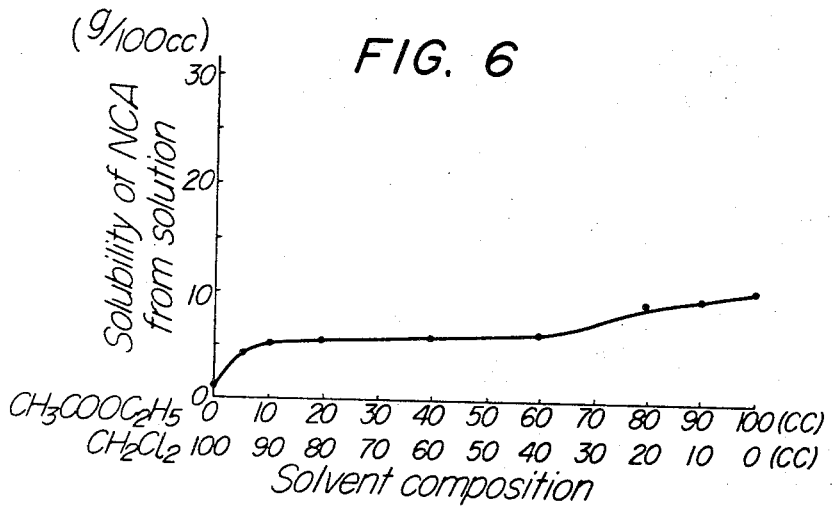
FIGURE 6 illustrates the solubility of γ-Me-Glu NCA from a solution mixture of ethyl acetate and methylene chloride.
Figure 10:
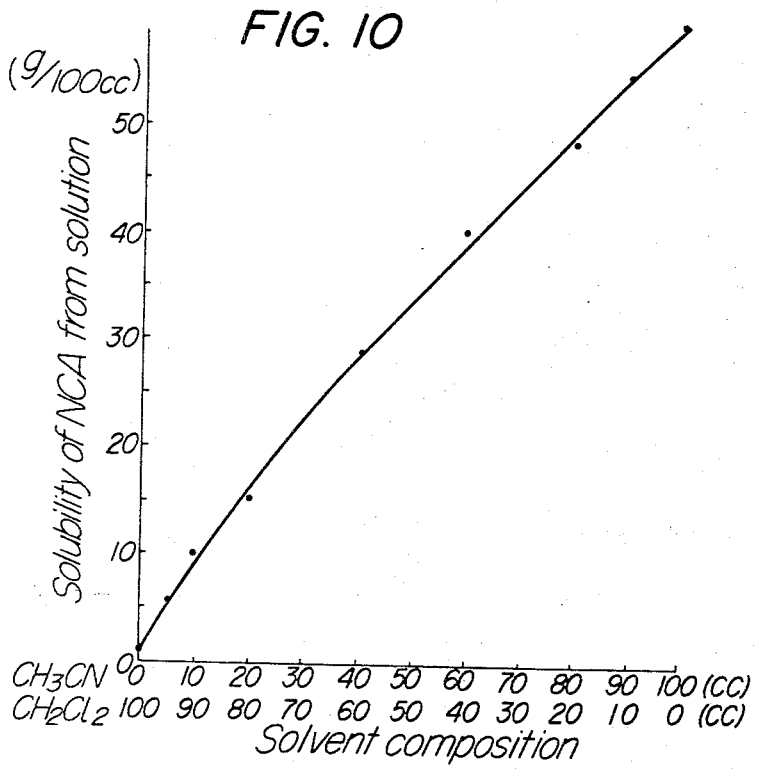
FIGURE 10 illustrates the solubility of γ-Me-Glu NCA from a solution mixture of acetonitrile and methylene chloride.
Figure 7:
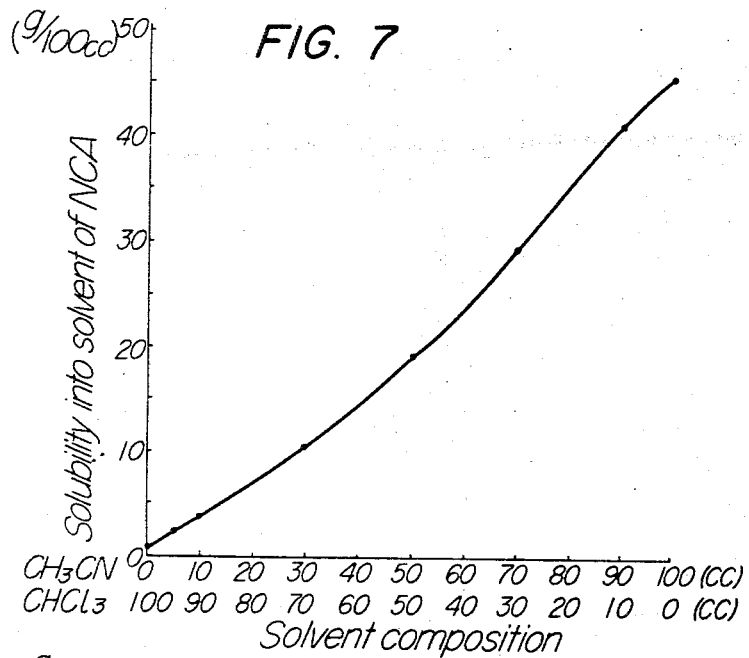
FIGURE 7 illustrates the solubility of γ-Me-Glu NCA in a mixed solvent of acetonitrile and chloroform.
Figure 8:
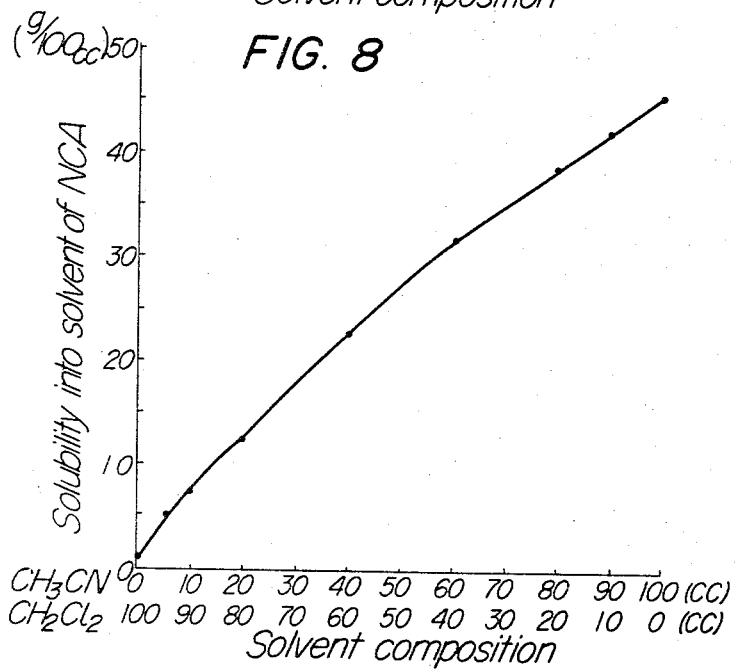
FIGURE 8 illustrates the solubility of γ-Me-Glu NCA in a mixed solvent of acetonitrile and methylene chloride.

In other words, FIGS. 1 to 6 illustrate the solubilities of γ-Me-Glu NCA at 20° C. for the various compositions of each solvent mixture consisting of 1,4-dioxane and chloroform, 1,4-dioxane and methylene chloride, or ethyl acetate and methylene chloride. As for the measurement of the solubilities, the solubilities in the solvents shown in FIGS. 1 to 3 are indicated by the concentration of γ-Me-Glu NCA dissolved in the solvent at 20° C. in equilibrium state, which is obtained by mixing a great excess of γ-Me-Glu NCA with the solvent and leaving the mixture at 20° C. until it reaches equilibrium. On the other hand, the solubilities from the solutions shown in FIGS. 4 to 6 are indicated by the concentration of γ-Me-Glu NCA which is obtained when a part of γ-Me-Glu NCA once dissolved by heating is precipitated at 20° C. and the mixture reaches equilibrium, for the uniform polymerization can be carried out without any trouble if γ-Me-Glu NCA is in the dissolved state.

In using the above polymerization solvents for the actual polymerization of γ-Me-Glu NCA, a process which comprises dissolving γ-Me-Glu NCA in the mixed solvent, or dissolving γ-Me-Glu NCA completely in a good solvent such as 1,4-dioxane or ethyl acetate and adding halogenated aliphatic hydrocarbons to this solvent, for effecting the polymerization as smoothly as possible and completing the polymerizaiton by decreasing the concentration of γ-Me-Glu NCA before it starts to separate, can be applied at the initial concentration of γ-Me-Glu NCA higher than the solubilities from the solution which are shown in FIGS. 4 to 6. However, such an operation is difficult in industrial scale.

From this point of view, the present inventors have carried out experiments on the solubilities of γ-Me-Glu NCA in many kinds of solvents and have found that acetonitrile is the solvent of the highest dissolving ability. Further, measuring the solubilities in solvents and the solubilities from solutions at 20° C. for various composition ratios of acetonitrile and chloroform or methylene chloride, the present inventors have obtained such results as shown in FIGS. 7 to 10. According to those figures, it is clear that the mixed solvent of acetonitrile and halogenated aliphatic hydrocarbons gives high solubilities in solvents for γ-Me-Glu NCA and the solubilities from solutions are still higher, so that such a mixed solvent is an excellent polymerization solvent for preparing solutions of poly-γ-Me-Glu which are used for the spinning or film forming process.

As described above, the mixed solvent of acetonitrile and halogenated aliphatic hydrocarbons dissolves γ-Me-Glu NCA in high concentration and, still further, we have carried out polymerization applying the various composition ratios of the mixed solvent of acetonitrile and halogenated aliphatic hydrocarbons as the polymerization solvent of γ-Me-Glu NCA. In consequence of these experiments, it has also been found that, even in the presence of a mixed solvent containing a large amount of acetonitrile, a transparent homogeneous polymer solution can be obtained without the separation of poly-γ-Me-Glu or turbidity or gelation of the polymer solution, so that the polymer solution can be used as such for preparing fibers or films or other shaped articles of poly-γ-Me-Glu.

Thus, in the process for the preparation of the solution of poly-γ-Me-Glu by using a mixed solvent of acetonitrile and halogenated aliphatic hydrocarbons as the polymerization solvent, the high solubility of γ-Me-Glu NCA facilitates the polymerization and a transparent homogeneous solution of highly concentrated poly-γ-Me-Glu can be obtained so that the solution can very conveniently be used as is for the spinning or film forming process on an industrial scale.

According to the present invention, various kinds of halogenated aliphatic hydrocarbons are used either alone or in combination, for example, chloroform, methylene chloride, dichloroethane, dichloroethylene, trichloroethane, trichloroethylene, tetrachloroethane, tetrachloroethylene, pentachloroethane, propylene chloride, dichloropropane, dichloropropylene, trichloropropane and the like, or more concretely, 1,1- or 1,2-dichloroethane, 1,2-dichloroethylene dichloride, 1,1,1-trichloroethane, 1,1,2-trichloroethane, 1,1,1,2-tetrachloroethane, 1,1-, 1,2-, 1,3- or 2,2-dichloropropane dichloride, 1,1-, 1,2-, 1,3-, 2,3-, or 3,3-dichloropropylene, 1,2,3-trichloropropane and the like. Among them, especially common are methylene chloride, chloroform, 1,1-dichloroethane, 1,2-dichloroethane, 1,2-dichloroethylene, 1,1,1-trichloroethane, 1,1,2-trichloroethane, trichloroethylene, 1,1,1,2-tetrachloroethane and the like.

In the present invention, the polymerization is carried out by adding the halogenated aliphatic hydrocarbon to an acetonitrile solution of γ-Me-Glu NCA at room temperature or under heating, or by adding γ-Me-Glu NCA at room temperature or under heating to a mixed solvent consisting of acetonitrile and halogenated aliphatic hydrocarbons. The concentration of γ-Me-Glu NCA in this polymerization solution varies according to the shaping process or kinds of shaped articles. Although the optimum concentration should be selected for different shaping processes or different purposes for which the shaped articles are to be used, the initial concentration of γ-Me-Glu NCA in the polymerization should be in the range of 3% to 45%, preferably 5% to 40% in the actual polymerization process.

It is desirable that the mixture of acetonitrile and halogenated aliphatic hydrocarbons contain less than 70 volume percent of acetonitrile. In the presence of more than 70 volume percent acetonitrile, a transparent uniform solution of poly-γ-Me-Glu can be not obtained in suitable concentration for the spinning or film forming. The said mixed solvent containing only about 1% of acetonitrile is also available.

The polymerization initiators used in the invention are amines, water, organic acids, hydroxides of alkali metals, alcoholates of alkali metals, organometallic compounds and the like. The amount of the initiator varies according to the kind of initiator, the purity of γ-Me-Glu NCA, the kind of halogenated aliphatic hydrocarbon, the mixing ratio of acetonitrile and halogenated aliphatic hydrocarbon and the purity of the solvents. It is desirable to select the optimum amount of the initiator so that the formed poly-γ-Me-Glu has in a dichloroacetic acid solution an intrinsic viscosity of 1.0 to 5.0, preferably 1.5 to 4.0 which is suitable for the actual preparation of fibers or films or other shaped articles.

When using a polymerization solution having an especially high initial concentration of γ-Me-Glu NCA, it is preferable to carry out the polymerization at the boiling point of the polymerization solution or above 30° C. However, except when polymerization in high concentration is essential, heating is not always required so that the polymerization can be carried out at room temperature.

The polymerization rate varies in accordance with the kind and amount of the polymerization initiator. The polymerization time is less than 2 hours usually and less than 10 hours at most. The completion of the polymerization can be ascertained when there is no further evolution of carbonic-acid gas and the rise in viscosity of the solution ceases.

The polymer solution thus obtained can be used as is as a solution for manufacturing fibers, films or other shaped articles. Prior to these shaping processes, it is desirable to remove foams from the solution in the same manner as is usually done. Thus, the solution can be used as is for manufacturing shaped articles, and can also be combined with the following processes. For example, a solution of L-form poly-γ-Me-Glu can be mixed with that of D-form poly-γ-Me-Glu in any mixing ratio or it may be added to a mixed solvent of acetonitrile and halogenated aliphatic hydrocarbons having dissolved therein other polyamino acids, vinyl polymers and the like and which can form a stable polymer solution with the solution of optically active poly-γ-Me-Glu consisting of the solution of L- or D-form poly-γ-Me-Glu or a mixed solution thereof in any mixing ratio as the principal component which amounts to more than 90 weight percent of all the included polymers.

The poly-γ-Me-Glu according to the present invention is a polymer consisting of more than 90 weight percent optically active γ-Me-Glu units. With the object of improving dyeability, and/or the hygroscopic or mechanical properties of the present poly-γ-Me-Glu, it may be copolymerized with one or more members selected from the group consisting of the derivatives of γ-Me-L-Glu or γ-Me-D-Glu, or γ-Me-DL-Glu, γ-ethyl-, γ-propyl-, γ-isopropyl-, γ-n-butyl-, γ-isobutyl-, γ-t-butyl- or benzyl-, L- or D- or DL-Glu or derivatives thereof, or other α-amino acids, such as, optically active or inactive neutral amino acids, for example, glycine, alanine, α-amino isobutyric acid, phenyl alanine, leucine, isoleucine, valine, cystine, cysteine, methionine or the like; acidic amino acids, for example, aspartic acid, α-amino adipic acid or ω-esters thereof; basic amino acids, for example, ornithine, lysine, arginine or N-derivatives thereof.

The optimum concentration of the poly-γ-Me-Glu solution is selected in accordance with the process of manufacturing shaped articles from the polymer solution, and in further accordance with the different shaping processes depending on the kind or the desired properties of shaped articles, and is usually in the range of 2 to 30 weight percent, preferably 3 to 25 weight percent. It is desirable that the viscosity of polymer solution be in the range of 10 to 1,000 poises, especially 20 to 500 poises at 25° C.

In the preparation of such shaped articles as fibers or films from the said solution of poly-γ-Me-Glu, the so-called dry shaping process or wet shaping process may be applied.

In the dry shaping process, the mixed solvent of acetonitrile and halogenated aliphatic hydrocarbons, is removed from the solution of poly-γ-Me-Glu by evaporation to obtain a coagulated polymer, and if necessary, the polymer molecules are oriented by stretching to increase the strength of the shaped articles. In case of film forming, stretching may be in one direction or two directions at right angle to one another. The poly-γ-Me-Glu obtained according to the present invention has an α-configuration in solution and, after removing the solvent by evaporation, the most of polymer molecules are in α-helix configuration. This coagulated polymer may be stretched and transformed into a β-configuration to increase the strength of shaped articles. In general, the temperature of hot air for evaporating the solvent is from 70° to 150° C. near the outlet of the polymer solution, and it may suitably be selected according to the kind of polymerization solvent used, especially the solvent of the polymer, i.e., halogenated aliphatic hydrocarbons. The degree of stretching of the coagulated polymer varies according to the required mechanical properties of the shaped articles. In the case of fibers, the stretching is usually applied to increase the strength thereof while the stretching of films is not always required. The stretching of fibers may usually be in the range of 60 to 150%, preferably 80 to 120%, and while stretching can be effected at room temperature, it is preferably done at a temperature of 50° to 100° C. When strength is required in the case of films, stretching may be as desirable as in the case of fibers.

On the other hand, in the preparation of such shaped articles as fibers or films according to the wet shaping process, the coagulated polymer is obtained by extruding the polymer solution into a coagulation bath containing a suitable coagulating agent which does not dissolve the polymer but mixes well with the polymer solvent. If necessary, the polymer can be stretched and oriented to increase the strength of the shaped articles. The stretching may be in one direction or two directions at right angle to one another in cases of film forming.

In the wet shaping process, the major part of the coagulated polymer molecules also have an α-configuration and, therefore, can be stretched and transformed into a β-configuration in the same manner as in the dry shaping process in order thereby to increase the strength of shaped articles. In this wet shaping process, the selection of a suitable coagulation bath is extremely important for manufacturing shaped articles, especially fibers and films of excellent mechanical properties.

In the wet spinning of a poly-γ-Me-Glu solution prepared in a mixed solvent of acetonitrile and halogenated aliphatic hydrocarbons, the present inventors have studied methanol, ethanol, propanol, isopropanol, n-butanol, isobutanol, t-butanol, diethyl ether, acetone, methylethyl ketone, methoxyethanol, and mixtures thereof for the coagulation bath, and have found that a mixture of acetone and methanol, 90–50:10–50, preferably 95–60:5–40, by volume to be the most suitable coagulation bath. This is called the first group of coagulation bath. When using the first coagulation bath, the draft (the ratio of the drawing velocity V of the coagulated fiber immediately after passing through the coagulation bath to the extruding linear velocity V of the polymer solution, v./v.) can be of great magnitude if desired, at the coagulation bath and coagulation can be carried out effectively to easily stretch the coagulated fiber to a high degree. Therefore, the monofilament denier of the obtained fiber is small, and it has a silk-like gloss, great strength and proper elongation to serve as good fibers for clothing. Further, studying combinations of various solvents as the coagulation bath for wet spinning, the present inventors have found the following coagulation bath as effective as the acetone-methanol bath, in the preparation of poly-γ-Me-Glu fibers. Thus, the so-called second group of coagulation bath is acetonitrile or a mixture of acetonitrile and halogenated aliphatic hydrocarbons containing more than 75% acetonitrile. The halogenated aliphatic hydrocarbons are the same as those described above as a suitable component of the polymerization solvent. Although it is not necessary that the halogenated aliphatic hydrocarbons in the coagulation bath be of the same kind as that of halogenated aliphatic hydrocarbons in the polymer solution, a simple composition obtained by using the same solvents makes recovery of the coagulation bath convenient. When the coagulation bath contains more than 80 to 90 volume percent acetonitrile, the obtained fibers have especially excellent properties.

As a third group of coagulation baths, we have found effective mixtures of acetonitrile and a solvent which does not dissolve optically active poly-γ-Me-Glu and containing 5 to 95 volume percent acetonitrile.

As the solvent which does not dissolve optically active poly-γ-Me-Glu, the following are used water, alcohols, ketones, ethers, esters, aromatic hydrocarbons, halogenated aromatic hydrocarbons, nitrated hydrocarbons, N,N-disubstituted amides, sulfoxides, sulfones and the like. When the coagulation bath contains 10 to 50 volume percent acetonitrile, the obtained fibers have especially excellent properties. Among the above solvents water, methanol, ethanol, acetone, 1,4-dioxane, 4,4-dimethyl-1,3-dioxane, tetrahydrofurane, ethyl acetate, benzene, toluene, monochlorobenzene, nitrobenzene, dimethyl formamide, dimethyl sulfoxide and dimethyl sulfone are representative.

As a fourth group of coagulation baths we have found effective mixtures of halogenated aliphatic hydrocarbons and at least one member selected from the group consisting of alcohols, ketones, ethers, esters, aliphatic or aromatic hydrocarbons and halogenated aromatic hydrocarbons, which contains 5 to 25 volume percent halogenated aliphatic hydrocarbons. These halogenated hydrocarbons may be the same as described above as a component of the polymerization solvent. Although it is not necessary that the halogenated aliphatic hydrocarbons in the coagulation bath be the same as that of halogenated aliphatic hydrocarbons in the polymer solution, the use of the same solvents is desirable with respect to the recovery of the coagulation bath. Representative of the solvent the mixed with halogenated aliphatic hydrocarbons for the coagulation bath are methanol, ethanol, propanol, acetone, methylethyl ketone, 1,4-dioxane, 4,4-dimethyl-1,3-dioxane, tetrahydrofurane, methyl acetate, ethyl acetate, methyl propionate, ethyl propionate, hexane, heptane, benzene, toluene, xylene, monochlorobenzene, dichlorobenzene and the like.

As a fifth group of coagulation baths, there are mixtures of acetone and water, 99–90:1–10 by volume. When the mixture of acetone and water containing 1 to 10 volume percent water is used as the coagulation bath, the coagulation can be carried out under more moderate conditions as compared to the sole use of acetone. In addition the draft is larger and the coagulated polymer can more easily be stretched. This desirable effect is most effectively achieved by using 3 to 7 volume percent water. As the volume of water becomes higher than 10%, especially 15%, devitrification becomes remarkable, spinning is difficult; spinning becomes impossible in a coagulation bath of water alone. As a sixth group of coagulation baths there are mixtures of acetone and ethanol, 95–50:5–50 by volume. With coagulation baths consisting of mixtures in the above mixing ratios, coagulation is more moderately carried out, the draft is larger and the coagulated polymer can more easily be stretched, as compared to the use of acetone or ethanol alone or a mixture of acetone and ethanol in the ratio beyond the stated range. This effect is most noticeable in cases of 10 to 40 volume percent ethanol.

The compositions of the coagulation bath described above are for fiber spinning but they are also available for the poly-γ-Me-Glu solution ejected from the slit when manufacturing films. By using the said coagulation baths, a transparent, tough film can easily be obtained.

For manufacturing shaped articles, the draft as defined above in the coagulation bath is in the range of 0.5 to 2.5, preferably 0.7 to 2.0. The coagulation baths according to the present invention may be used with very large drafts, even though the process is not always carried out at a maximum draft in the actual manufacture of shaped articles. That is, the draft is to be suitably selected in accordance with the states of the coagulated polymer and the conditions of the subsequent processes, such as stretching. The temperature of the coagulation bath depends upon the molecular weight ($[\eta]$ represents its index) of the polymer to be shaped, the concentration, viscosity and temperature of the polymer solution and the composition of the coagulation bath, and is usually in the range of 5° to 60° C., preferably 10° to 50° C. The length of the coagulation bath depends upon the bath temperature, the spinneret diameter, the number of the spinneret and the nozzle and the gap of the slit. The sufficient length is usually from 40 to 100 cm.

Prior to stretching the coagulated polymer obtained from the coagulation bath, it is usually washed to remove the solvent of the coagulation agent. In this case, the washing agent is usually water which is effective in general. Suitable organic solvents which do not dissolve polymer, for example, acetone, methanol or a mixture thereof with water are also useful. The temperature of the washing bath is in the range of 10° to 80° C., preferably 20° to 70° C. In the washing bath, the washing effect is rather larger when the coagulated polymer is tensionless or is stretched by less than 30%.

The stretched shaped articles, if necessary, are oiled and dried. The drying process is usually carried out with air at room temperature or hot air of 50° to 80° C.

In the above explanation, the shaped articles of poly-γ-Me-Glu are represented by fibers or films for the sake of illustration only, so the present invention is also available for manufacturing shaped articles such as spongy porous articles, blocks, powders, sheets or plates.

The examples according to the present invention are given below for the purpose of illustration only.

Example 1

20 g. of purified L-form γ-Me-Glu NCA were dissolved in 20 cc. of purified acetonitrile at 50° C. with stirring. The solution was mixed with 175 cc. of purified methylene chloride and immediately thereafter with a solution of 0.106 cc. tri-n-butyl amine in 5 cc. purified methylene chloride. After vigorous stirring, the resulting mixture was left at 22° C. 2 or 3 minutes later, evolution of carbonic acid gas was observed and the viscosity of the polymerization solution began to increase.

After 30 minutes of reaction, the polymerization was completed. The obtained polymer solution was a transparent homogeneous solution. A B-type rotary viscosimeter-H form (made by Tokyo Keiki Co.) was used to measure the viscosity at 25° C., which was 525 poises at 2 r.p.m., 285 poises at 10 r.p.m., 235 poises at 20 r.p.m. A part of the polymer solution extended on a glass plate was dipped in methanol to separate poly-γ-Me-Glu. After drying, a sample thereof was dissolved in dichloroacetic acid and $[\eta]$ was measured at 35° C., and found to be 3.27. (The measurement of $[\eta]$ was the same in the following examples.)

Example 2

After dissolving 20 g. of purified L-form γ-Me-Glu NCA in 60 cc. of purified acetonitrile at room temperature with stirring, 135 cc. of purified methylene chloride and a solution of 0.106 cc. tri-n-butylamine diluted by 5 cc. purified methylene chloride were added thereto and, the resulting mixture was stirred vigorously and left at 22° C. 2 or 3 minutes later, evolution of carbonic acid gas was observed and the viscosity of the polymerization solution began to increase. After 30 minutes of reaction, the polymerization was completed. The obtained polymer solution was a transparent homogeneous solution. The viscosity measured as in Example 1 was 425 poises at 2 r.p.m., 350 poises at 4 r.p.m., 255 poises at 10 r.p.m. and 207.5 poises at 20 r.p.m. This poly-γ-Me-Glu has $[\eta]$ of 3.05.

Example 3

At 25° C. in a mixed solution of methylene chloride 75 volume percent and acetonitrile 25 volume percent, using tri-n-butyl amine as an initiator, polymerization was carried out for 0.5 hour to obtain L-form poly-γ-Me-Glu of $[\eta]=2.45$. After removing foam from the solution, which comprises 10.1 weight percent L-form poly-γ-Me-Glu the latter was extruded by a gear pump through a nozzle containing 26 spinnerets of 0.1 m. diameter into a coagulation bath of acetone 75 volume percent and methanol 25 volume percent according to the present invention or into another coagulation bath of acetone 65 volume percent and methanol 35 volume percent not in accordance with the present invention (both the bath temperatures were 20° C. and the bath length 80 cm.) at a rate of 20.1 m./min. whereby it is coagulated, then washed at 20° C. in a water bath of 100 cm. length and stretched at 70° C. in a hot water bath of 100 cm. length. Table 1 shows the strength and elongation of the fibers obtained at the maximum winding speed (called maximum spinnable speed), which maximum obtains immediately after passing through the coagulation bath; and at the maximum stretching for stable spinning. The measuring length was 25 mm., the drawing speed 25 mm./min., temperature 20° C., and relative humidity 65%. In the case of fibers, a single fiber was measured and in the case of film, a film of 5 mm. width was measured. In Table 1, the mark * represents spinning of the coagulation bath having the composition in accordance with the present invention, the mark °, a bath composition range not in accordance with the present invention and the mark ∆ a bath composition different from that according to the present invention and the same spinning as the invention.

TABLE 1

| Coagulation bath composition | Composition in vol. ratio | Max. spinnable rate (m./min.) | Dry strength (g./denier) | Dry elongation (percent) |
|---|---|---|---|---|
| Acetone-methanol*__ | 75:25 | 43 | 3.31 | 17.0 |
| Acetone-methanol*__ | 65:35 | 39 | 3.17 | 18.1 |
| Acetone-methanol°__ | 35:65 | 20 | 2.18 | 24.8 |
| Acetone-ethanol*____ | 75:25 | 35 | 3.18 | 16.0 |
| Acetone-water*_____ | 94:6 | 43 | 3.27 | 14.5 |
| Methanol∆_____ | Single | (¹) | | |
| Acetone∆_____ | Single | 17 | 2.10 | 23.7 |
| Diethyl ether∆_____ | Single | 18 | 1.89 | 22.3 |
| Methylethyl ketone∆_ | Single | 16 | 1.37 | 30.3 |

¹ Spinning impossible.

Example 4

At 25° C. in a mixed solution of 1,2-dichloroethane 80 volume percent and acetonitrile 20 volume percent, using tri-n-butyl amine as an initiator, polymerization was carried out for 2 hours to obtain D-form poly-γ-Me-Glu of $[\eta]=2.74$. After removing foam from the solution of 8.0 weight percent D-form poly-γ-Me-Glu, the solution was extruded by a gear pump through a nozzle of 33 spinnerets of 0.08 mm. diameter into a coagulation bath 100 cm. long at 20° C. containing acetone 75 volume percent and methanol 25 volume percent at an extruding rate of 15.5 m./min., to be coagulated. The coagulated fiber was passed at the speed of 20 m./min. in the coagulation bath, washed in a water bath 100 cm. long at 20° C., passed through this water bath at the rate of 22 m./min., stretched in a hot water bath 100 cm. long at 70° C. and wound at the rate of 45 m./min.

The fiber obtained by drying at 60° C. had a dry strength of 3.27 g./denier and a dry elongation of 16.0%.

Example 5

At 30° C. in a mixed solution of methylene chloride 50 volume percent and acetonitrile 50 volume percent, using tri-n-butyl amine as an initiator, copolymerization of a mixture of each form of NCA was carried out for 2 hours, to obtain a 10.2 weight percent solution of a copolymer consisting of γ-Me-L-Glu 95 weight percent and L-alanine 5 weight percent having $[\eta]=2.25$. After removing foam, this solution was extruded through a nozzle of 26 spinnerets of 0.1 mm. diameter by a gear pump into a coagulation bath 100 cm. long at 25° C. containing acetone 75 volume percent and methanol 25 volume percent to be coagulated, passed at the rate of 13.5 m./min., washed in a water bath 150 cm. long at 22° C., passed at the rate of 15 m./min. through this water bath, stretched in a hot water bath 100 cm. long at 75° C. and wound at the rate of 35 m./min. The fiber obtained by drying at 60° C. had a single fiber denier of 2.03, a dry strength of 3.34 g./denier and a dry elongation of 15.2%.

Example 6

At 30° C. a mixed solution of chloroform 50 volume percent and acetonitrile 50 volume percent, using tri-n-butyl amine as an initiator, polymerization was carried out for 2.5 hours. The obtained solution of 11.8 weight percent D-form poly-γ-Me-Glu having $[\eta]=2.27$ was extruded into a coagulation bath as in Example 5, washed, stretched, and dried, to prepare the D-form poly-γ-Me-Glu fiber having a single fiber denier of 2.17, the dry strength of 2.78 g./denier and a dry elongation 17.6%.

Example 7

Polymerization was carried out for 2 hours using tri-n-butyl amine as an initiator at 30° C. in a mixed solution of methylene chloride 60 volume percent and acetonitrile 40 volume percent. The obtained solution of 15.2 weight percent D-form poly-γ-Me-Glu having $[\eta]=2.52$ was, after removing foams extruded through a nozzle of 0.1 mm. in spinneret diameter and having 33 spinnerets by a gear pump into various coagulating baths (21° C. bath temperature and 75 cm. long in every case) at an extruding rate of 21.9 m./min. to be coagulated, washed in a water bath 100 cm. long at 25° C. and stretched in a hot water bath 100 cm. long at 75° C. According to the definitions as given in Example 3, Table 2 gives the strengths and elongations of the fiber obtained at the maximum spinnable rate and the maximum stretching for safe spinning. The meaning of marks in Table 2 corresponds to those given in Example 3.

TABLE 2

| Coagulation bath composition | Composition in vol. ratio | Max. spinnable rate (m./min.) | Dry strength (g./denier) | Dry elongation (percent) |
|---|---|---|---|---|
| Acetone-methanol*__ | 85:15 | 45 | 3.17 | 16.8 |
| Acetone-methanol*__ | 60:40 | 40 | 3.19 | 15.8 |
| Acetone-methanol°__ | 95:5 | 24 | 2.25 | 22.4 |
| Acetone-ethanol*____ | 70:30 | 41 | 3.18 | 15.4 |
| Methanol∆_____ | Single | (¹) | | |
| Acetone∆_____ | Single | 14 | 2.18 | 22.3 |
| Acetone-water*_____ | 95:5 | 38 | 3.06 | 17.0 |

¹ Spinning impossible.

Example 8

Polymerization was carried out in a mixed solution of methylene chloride 75 volume percent and acetonitrile 25 volume percent, in the same manner as in Example 3. After removing foam, the solution of 11.0 weight percent D-form poly-γ-Me-Glu having $[\eta]=2.80$ was extruded through a slit 50 cm. long having a gap of 0.3 mm. into a coagulation bath of acetone 80 volume percent and methanol 20 volume percent, coagulated and using rollers was passed through a water bath 200 cm. long at 30° C. Then, it was dried by a heating roller with a surface temperature of 65° C., to obtain a colorless transparent, tough film of D-form poly-γ-Me-Glu. It had a dry strength of 9.5 kg./mm.² and a dry elongation of 118%.

Example 9

After removing foam from a solution of D-form poly-γ-Me-Glu according to Example 3, the solution was extruded through a slit 50 cm. long having a 0.5 mm. gap and rolled with rotary horizontal metal rollers of 50 cm. in diameter and 70 cm. in length having a surface temperature of 35° C. Most of the solvent was thereby evaporated and the polymer was coagulated and the recovered film was dried by hot air of 90° C. Then, it was rolled in one direction in hot water at 70° C. to be stretched by 100% and dried to obtain a colorless transparent, tough film of D-form poly-γ-Me-Glu which

Example 11

A washing bath consisting of equal volumes of water and methanol was provided instead of the washing bath used in Example 10, and was used for washing the coagulated fibers. Then, the fibers were washed again in a water bath 50 cm. long at 35° C. The other steps were carried out according to Example 10. The spinning results in the said process of the D-form poly-γ-Me-Glu solution obtained in Example 10 were as shown in Table 4.

TABLE 4

| Coagulation bath composition | Composition in vol. ratio | Max. spinnable rate (m./min.) | Max. elongation (percent) | Dry strength (g/denier) | Dry elongation (percent) |
|---|---|---|---|---|---|
| 1,2-dichloroethane*~methanol | 20:80 | 43.8 | 125 | 3.42 | 14.9 |
| 1,2-dichloroethane*~methanol~acetone | 10:60:30 | 44.4 | 130 | 3.43 | 13.1 |
| 1,2-dichloroethane°~methanol | 40:60 | (1) | | | |
| Methylene chloride*~methanol | 15:85 | 40.8 | 120 | 3.33 | 15.2 |
| Methanol△ | Single | (1) | | | |
| Acetone△ | Single | 18.9 | 75 | 2.18 | 25.0 |
| 1,2-dichloroethane*~acetone | 15:85 | 40.4 | 130 | 3.33 | 15.0 |
| 1,2-dichloroethane°~acetone | 30:70 | (1) | | | |
| 1,4-dioxane△ | Single | 20.0 | 85 | 2.18 | 21.0 |
| 1,2-dichloroethane*~1,4-dioxane | 10:90 | 45.5 | 130 | 3.21 | 13.3 |
| 1,2-dichloroethane°~1,4-dioxane | 30:70 | (1) | | | |
| Ethyl acetate△ | Single | 21.5 | 80 | 1.98 | 21.0 |
| 1,2-dichloroethane*~ethyl acetate | 8:92 | 38.7 | 130 | 3.21 | 13.5 |
| 1,2-dichloroethane°~ethyl acetate | 35:65 | (1) | | | |
| Toluene△ | Single | 20.0 | 80 | 2.01 | 23.1 |
| 1,2-dichloroethane*~toluene | 15:85 | 35.3 | 100 | 2.77 | 17.7 |
| 1,2-dichloroethane°~toluene | 40:60 | (1) | | | |
| n-Heptane△ | Single | (1) | | | |
| 1,2-dichloroethane*~n-Heptane | 10:90 | 28.0 | 90 | 2.50 | 18.9 |
| Monochlorobenzene△ | Single | 18.8 | 60 | 1.32 | 27.5 |
| 1,2-dichloroethane*~monochlorobenzene | 20:80 | 38.0 | 110 | 2.83 | 16.8 |

1 Spinning impossible.

had a dry strength of 31 kg./mm.$^2$ and a dry elongation of 26%.

Example 10

Polymerization of D-form γ-Me-Glu NCA was carried out for 1 hour using tri-n-butyl amine as an initiator at 45° C. in a mixed solution of 1, 2-dichloroethane 75 volume percent and acetonitrile 25 volume percent, to obtain a 10.2 weight percent solution of D-form poly-γ-Me-Glu having $[\eta]=2.50$. It was ejected from a nozzle having 26 spinnerets of 0.08 mm. in diameter at the ejecting rate of 20.3 m./min. into a coagulation bath 80 cm. long kept at 20° C. which bath was of the various compositions shown in Table 3. Then, the coagulated polymer was washed in a water bath 100 cm. long, and was stretched in a hot water bath at 75° C. Among the spinning results, Table 3 gives the maximum spinnable rate, the strength and elongation of the fibers obtained and the maximum stretching for stable spinning was given. The draft ratio was maintained at 0.8. The meaning of the symbols in Table 3 corresponds to those given in Example 3.

Example 12

The polymerization was carried out for 2 hours by using tri-n-butyl amine as an initiator at 45° C. in a mixed solution of 1,2-dichloroethane 70 volume percent and acetonitrile 30 volume percent. After removing foam, the obtained 11.6 weight percent solution of D-form poly-γ-Me-Glu having $[\eta]=2.50$ was heated to 60° C. and was extruded downward from a nozzle of 26 spinnerets of 0.08 mm. in diameter at an ejecting rate of 190 m./min. into the top of a dry spinning cell through which heated air of 100° to 105° C. was passing upwards at the rate of about 1 m./min.

In the dry spinning cell of 20 cm. internal diameter and 4 m. in length, the solvent of the solution was evaporated during passage therethrough. The coagulated fiber being not twisted was wound at the bottom of the cell at the rate of 186 m./min.

The obtained unstretched fiber was stretched by 110% in a hot water bath 100 cm., long, at 70° C., and the resultant D-form poly-γ-Me-Glu fiber consisted of 26

TABLE 3

| Coagulation bath composition | Composition in vol. ratio | Max. spinnable rate (m./min.) | Max. elongation (percent) | Dry strength (g/denier) | Dry elongation (percent) |
|---|---|---|---|---|---|
| Acetonitrile* | Single | 30.2 | 110 | 2.85 | 16.7 |
| 1,2-dichloroethane*~acetonitrile | 5:95 | 35.4 | 120 | 3.01 | 17.0 |
| 1,2-dichloroethane*~acetonitrile | 15:85 | 45.7 | 124 | 3.33 | 15.0 |
| 1,2-dichloroethane*~acetonitrile | 18:82 | 38.0 | 105 | 2.72 | 15.2 |
| 1,2-dichloroethane°~acetonitrile | 35:65 | (1) | | | |
| Methylene chloride*~acetonitrile | 15:85 | 42.3 | 118 | 3.18 | 16.1 |
| Methanol△ | Single | (1) | | | |
| Acetone△ | Single | 18.5 | 72 | 2.05 | 25.7 |
| Acetonitrile~methanol° | 3.97 | (1) | | | |
| Acetonitrile~methanol* | 15:85 | 32.6 | 120 | 2.91 | 16.3 |
| Acetonitrile~methanol* | 40:60 | 44.7 | 130 | 3.51 | 15.4 |
| Acetonitrile~methanol* | 80:20 | 37.4 | 125 | 3.31 | 16.9 |
| Acetonitrile~methanol° | 97:3 | 31.0 | 120 | 3.20 | 15.8 |
| Acetonitrile~acetone* | 30:70 | 38.3 | 135 | 3.33 | 14.0 |
| Water△ | Single | (1) | | | |
| Acetonitrile~water* | 40:60 | 32.9 | 140 | 3.43 | 13.0 |

1 Spinning impossible.

monofilaments and had a yarn denier of 64.2, dry strength of 3.02 g./denier and dry elongation of 14.2%.

*Example 13*

Polymerization was carried out for 2 hours by using tri-n-butyl amine as an initiator in a mixed solution of 1,2-dichloroethane 60 volume percent and acetonitrile 40 volume percent. After removing foam, the obtained 11.2 weight percent solution of a copolymer consisting of γ-methyl L-glutamate 92 weight percent and L-alanine 8 weight percent having $[\eta]=2.34$ was heated to 60° C., and was extruded downward from a nozzle of 26 spinnerets of 0.08 mm. in diameter at an ejecting rate of 185 m./min. into the top of a dry spinning cell through which hot air of 100° to 105° C. was passed upwards at the rate of about 1 m./min.

During passage through the dry spinning cell which has internal diameter of 20 cm. and length of 4 m., the solvent of the solution was evaporated and the coagulated fibers being not twisted were wound at the bottom of the cell at the rate of 181 m./min.

The obtained unstretched fiber was stretched by 110% in a hot air bath 200 cm. long, at 110° C., and the resulting fiber consisting of said copolymer consisted of 26 monofilaments and had a yarn denier of 62.8, dry strength of 2.77 g./denier and dry elongation of 17.0%.

What is claimed is:

1. A process for manufacturing shaped articles of optically active poly-γ-methyl glutamate, said method comprising polymerizing optically active γ-methyl glutamate N-carboxy anhydride by using as a polymerization solution a mixture of acetonitrile and at least one halogenated hydrocarbon wherein the acetonitrile comprises at most 70% by volume to form a polymer in the solution and subjecting said polymer solution to a shaping step.

2. A process as claimed in claim 1 wherein said polymer solution is subjected to dry shaping.

3. A process as claimed in claim 1 wherein said polymer solution is subjected to wet shaping.

4. A process as claimed in claim 3 wherein a mixture of acetone and methanol in a ratio of 95–50:5–50 by volume is used as a coagulation bath.

5. A process as claimed in claim 3 wherein a mixture of acetonitrile and at least one halogenated aliphatic hydrocarbon in a ratio of 100–75:0–25 by volume is used as a coagulation bath.

6. A process as claimed in claim 3 wherein a mixture of acetonitrile and at least one solvent in which optically active poly-γ-methyl glutamate is insoluble in a ratio of 5–95:95–5 by volume is used as a coagulation bath.

7. A process as claimed in claim 3 wherein a mixture of at least one halogenated aliphatic hydrocarbon and at least one member selected from the group consisting of alcohols, ketones, ethers, esters, aliphatic hydrocarbons, aromatic hydrocarbons and halogenated aromatic hydrocarbons in a ratio of 5–25:95–75 by volume is used as a coagulation bath.

8. A process as claimed in claim 3 wherein a mixture of acetone and water in a ratio of 99–90:1–10 by volume is used as a coagulation bath.

9. A process as claimed in claim 3 wherein a mixture of acetone and ethanol is a ratio of 95–50:5–50 by volume is used as a coagulation bath.

10. A process as claimed in claim 1, wherein the optically active poly-γ-methyl glutamate comprises at least 90 weight percent of optically active γ-methyl glutamate units.

11. A process as claimed in claim 1, wherein the shaped articles of optically active poly-γ-methyl glutamate are fibers.

12. A process as claimed in claim 1, wherein the shaped articles of optically active poly-γ-methyl glutamate are of film.

13. A process as claimed in claim 1 comprising stretching the coagulated optically active poly-γ-methyl glutamate by 60–150%.

References Cited

FOREIGN PATENTS

| 864,692 | 4/1961 | Great Britain. |
| 917,957 | 2/1963 | Great Britain. |
| 395,213 | 4/1964 | Japan. |

ALEXANDER H. BRODMERKEL, *Primary Examiner.*

H. H. MINTZ, *Assistant Examiner.*

UNITED STATES PATENT OFFICE
CERTIFICATE OF CORRECTION

Patent No. 3,344,219 September 26, 1967

Ryoichi Wakasa et al.

It is hereby certified that error appears in the above numbered patent requiring correction and that the said Letters Patent should read as corrected below.

In the heading to the printed specification, lines 7 and 8, for "Asahi Kasei Kogko Kabushiki Kaisha" read -- Asahi Kasei Kogyo Kabushiki Kaisha --.

Signed and sealed this 29th day of October 1968.

(SEAL)
Attest:

Edward M. Fletcher, Jr.

Attesting Officer

EDWARD J. BRENNER

Commissioner of Patents